This invention relates to apparatus for correcting the position of a measure-determining element of a machine tool in response to deviations from truth of a workpiece just machined. An example for an element of the kind in consideration is a lathe tool together with its carrying cross-slide in an automatic lathe. Another example is a positive stop abutment against which a tool slide or machine carriage is arrested as the workpiece has been machined to truth, i.e. to its nominal size. In a grinding machine said element may be a diamond adapted to dress the grinding disc thereby forming said disc with a cutting generatrix which is accurately positioned in the machine.

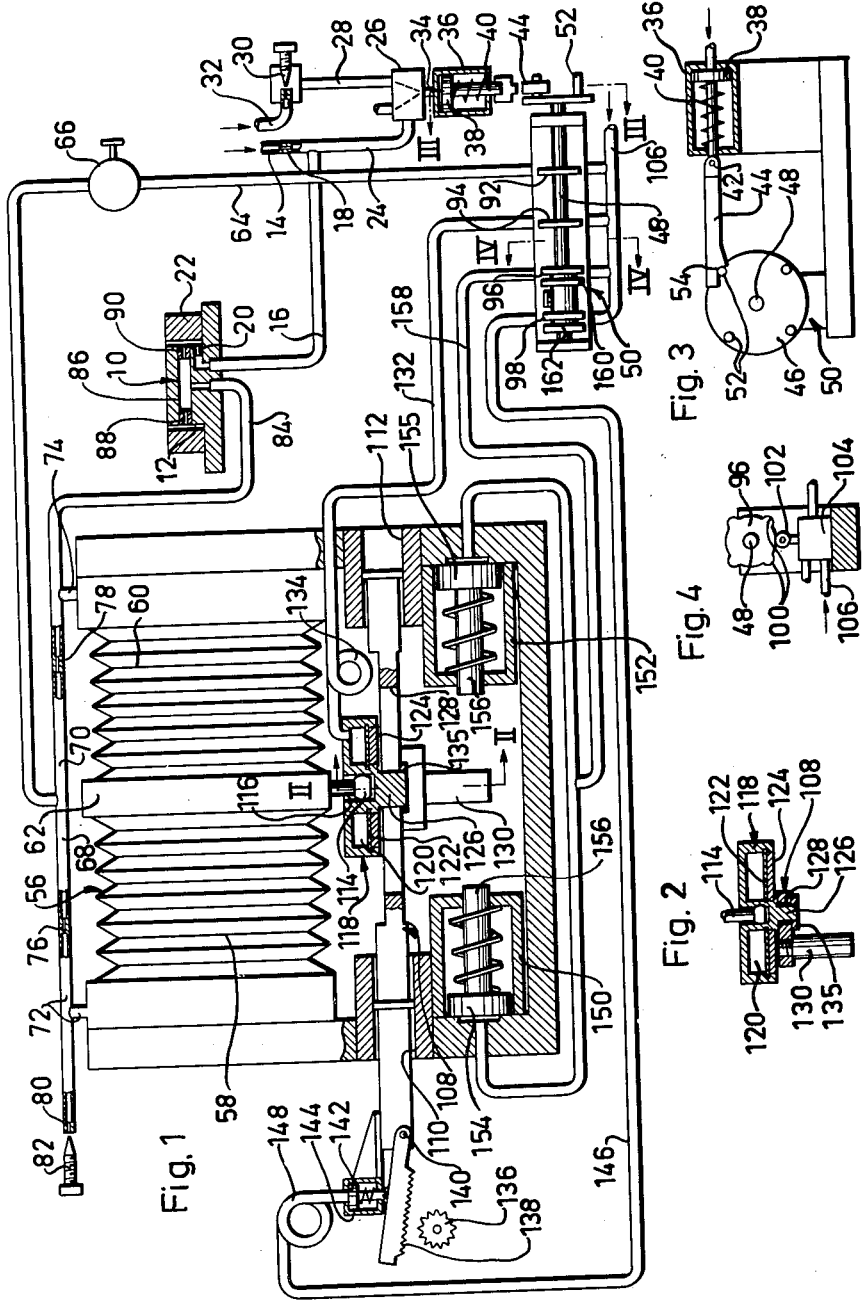
Oct. 9, 1962  G. GLUCHOWICZ  3,057,186
APPARATUS FOR CORRECTING THE POSITION OF A MEASURE-DETERMINING
ELEMENT OF A MACHINE TOOL
Filed April 8, 1960
INVENTOR
GIERSZON GLUCHOWICZ
By B. Schlesinger ATTORNEY 3,057,186
APPARATUS FOR CORRECTING THE POSITION OF A MEASURE-DETERMINING ELEMENT OF A MACHINE TOOL
Gerszon Gluchowicz, Stockholm, Sweden, assignor to Ulvsunda Verkstader Aktiebolag, Bromma, Sweden, a corporation of Sweden
Filed Apr. 8, 1960, Ser. No. 21,015
Claims priority, application Sweden Apr. 9, 1959
8 Claims. (Cl. 73—37.9)

More particularly this invention relates to apparatus for correcting the position of a measure-determining element of a machine tool in response to deviations from truth of a workpiece just machined in which monitoring of the measure-determining element is effected by placing a workpiece just finished in a gauging device which causes a fluid under pressure to actuate the movable part of a servomotor. An example of such apparatus is described in my co-pending application Serial No. 521,281, filed July 11, 1955, now Patent No. 3,003,293, granted October 10, 1961. In the case of a deviation of the workpiece from truth an impulse will be produced adapted to adjust the position of the element, such as a diamond point in the machine so as to ensure the machining of the subsequent workpiece to truth.

One main object of the invention is to improve adjustment devices of the kind set forth so as to enable, inter alia, a more accurate adjustment of the element and to make available greater power for the execution of said adjustment. According to one main feature of the invention an auxiliary member disposed between said movable part and said element is controlled by said servomotor part in response to the magnitude of the deviation by a comparatively light force, exerted by said servomotor part, while the actuation of said element is effected by other means exerting a relatively heavy force. It is preferred to arrange the auxiliary member to be moved by said servomotor part when moving in one sense without any interconnection with the element, and when moving back towards the initial position to carry the element with it, while being actuated by a relatively heavy force. Thus the servomotor will only have to be dimensioned for the positioning of the auxiliary member proper, which may oppose a hardly noticeable resistance to movement. However, the auxiliary member will have been moved a distance proportional to the deviation from truth, and as the member is moved in the opposite sense while adjusting the element, a power of the required magnitude can be made available for this purpose. The return movement is preferably powered by one or two servomotors separate from the auxiliary member.

A further object of the invention is to provide an adjustment device which offers the possibility of adjusting the measure-determining element of the machine in response to the mean deviation resulting from a plurality of workpieces, such as four workpieces, for example, so as to avoid adjustments of the kind which occur due to random errors in the course of the machining. Obviously, when machining to very close tolerances, non-desirable manufacturing defects may be caused, not only by tool wear and by slight temperature fluctuations in the machine in the course of the day, but also by more or less unaccountable deficiencies in the machine.

Further objects and advantages of the invention will become apparent from the following description considered in connection with the accompanying drawing, which forms part of this specification, and of which:

FIG. 1 is a partly sectional and more or less diagrammatic representation of an apparatus embodying the invention, and FIGS. 2 to 4 are cross-sectional views along the lines II—II, III—III and IV—IV, respectively, of FIG. 1.

Referring to the drawing the measuring device of the embodiment shown has the form of an air-operated gauge 10 having a cylindrical surface 12 to which is connected a conduit 14, 16 extending from a source of fluid under pressure, preferably compressed air. The conduit 14 may be formed with a passage 18 of reduced diameter, and the supply conduit 16 may be provided with a nozzle 20 at its end opening through the cylindrical surface 12 of the gauge. The workpieces are in the illustrated embodiment assumed to be rings 22; the internal cylindrical surfaces of which are machined and which, for the purpose of checking said surfaces, are placed on the gauge so as to surround the surface 12 thereof. Air is continuously ejected through the gauge nozzle 20. As a workpiece 22 is placed on the gauge it will cover the air-outlet orifice thereby producing a pressure rise in the conduit 16 and thus in a conduit 24 extending to a three-way valve 26.

The valve 26 is connected to a further conduit 28 which through a throttling device 30 and a conduit 32 communicates with a source of pressure fluid, which may be the same as the above-mentioned source of compressed air. The inlet area of the conduit 28 is adjustable by the throttling device 30. The valve 26 has a further connection 34 to a servomotor 36 containing a reciprocatable, spring-loaded piston 38. Communication between the conduits 28 and 34 is normally cut off. However, when for the purpose of checking a workpiece 22 the latter is placed on the gauge and the pressure in the conduits 16 and 24 is thus caused to rise, the valve 26 will be shifted, causing air under pressure to be applied to the top face of the piston 38 through the conduit 28 so as to cause the piston to start an operating stroke.

The piston 38 carries a rod 40 pivoted at 42 (FIG. 3) to a lever 44. This lever co-operates with a disc 46 keyed to a shaft 48 of an automatic operation controller, or timer, generally designated by 50. Said disc is provided with a plurality of pins 52 uniformly spaced about the periphery of the disc. In the embodiment illustrated the number of pins 52 is four. The lever 44 may be formed with a notch-like recess or pawl 54 fitting the pins 52. On each operating stroke of the piston 38 the disc 46, and thus the shaft 48, is rotated counterclockwise as seen in FIG. 3 by an amount equal to a quarter of a revolution. Thus for a complete revolution, in the embodiment shown, the piston 38 will have to perform four operating strokes, the lever 44 then engaging and actuating in succession each pin of the disc. The controller 50 has for its purpose to direct fluid under pressure, which in the embodiment illustrated is compressed air, to various components of the apparatus in a manner to be explained in detail hereinafter.

In the embodiment shown a servomotor generally designated by 56 comprises two bellows 58, 60 which carry a partition 62 and which define together with this partition two mutually separate chambers. To displace the partition 62 in either direction from its initial position a resilient force will have to be overcome which may be created by the two bellows, for example. Extending from the controller 50 is a conduit 64 having a control valve 66 and which splits into two branch pipes 68, 70. The branch pipe 68 is connected through a pipe 72 to the left-hand chamber of the servomotor 56, as seen in FIG. 1, and the branch pipe 70 is connected to its right-hand chamber through a pipe 74. A throttling passage 76 is provided between the pipes 68 and 72, and a throttling passage 78 is provided between the pipes 70 and 74. The pipe 72 communicates with the open air through a throttling passage 80 which is adjustable by an element, such as a screw 82. The pipe 74 communicates through a pipe 84 with a passageway 86 within the gauge 10 having outlet orifices 88, 90 opening respectively at two diametrically opposite points of the cylindrical surface 12.

The shaft 48 of the controller carries cams 92, 94, 96 and 98 adapted to open and close valves. Each cam may be of the general configuration shown in FIG. 4 for the cam 96 which is formed with four circumferentially equally spaced lobes 100 adapted to actuate the spindle 102 of a valve 104. Thus such actuation will be effected four times in the course of each complete revolution of the cam. All the valves of the controller 50 communicate with a common supply conduit 106, extending from a source of compressed air.

As the cam 92 opens its valve compressed air will flow from the supply conduit 106 through the conduit 64 and through the two branch pipes 68, 72 and 70, 74. In the pipe 72 and in the left-hand chamber of the servo-motor 56 there will always prevail a constant pressure, when cam 92 opens its value, which is determined by the setting of the throttling device 80, 82. When the conduit 64 is supplied with compressed air in this way, a workpiece 22 will have been placed about the cylindrical surface 12 of the gauging device 10, as described hereinbefore. Accordingly a pressure will be built up in the pipe 84 the magnitude of which is related to the internal diameter of the workpiece, i.e. to the actual clearance between the workpiece and the surface 12. As a consequence a pressure will be produced in the right-hand chamber of the servomotor 56 which pressure varies between successive checks depending on the actual inner diameters of the workpieces 22. This pressure may be higher or lower than the pressure existing in the left-hand chamber of the servomotor and resulting in displacement of the partition 62 in one direction or the other. The servomotor 56 could also be considered to be a differential manometer operating in response to differential pressures created in the pneumatic system described.

An auxiliary member generally designated by 108 is mounted in bores 110, 112 in the stationary frame of the apparatus so as to be displaceable in the longitudinal direction of these bores while opposing a minimum of resistance to such displacement. The partition member 62 of the servomotor carries a pin 114 suitably provided with a ball-shaped head seated in a central recess 116 in a servomotor 118. This latter has an annular chamber 120 the bottom of which is closed by a flexible membrane 122. An annular disc 124 may in turn be attached to the membrane 122. The servomotor 118 has a central boss 126 which fits in a longitudinal slot 128 formed in the auxiliary member 108, which carries a downwardly directed projection 130.

The cam 94 of the controller 50, by actuation of its corresponding valve, controls the supply of compressed air from the supply conduit 106 to a conduit 132 communicating with the chamber 120 and of a construction such as to allow endwise movements of the servomotor 118, as indicated by the loop 134. The auxiliary member 108 is displaceable endwise relative to the servomotor 118 when the chamber 120 is relieved of pressure. On the other hand, when pressure is applied to the chamber the membrane 122 will clamp the auxiliary member between the disc 124 and an abutment or shoulder 135 on the boss 126 thus causing the auxiliary member to move axially together with the partition 62.

The element of the machine tool to be positionally monitored in accordance with the invention is connected with a member 136, which in the illustrated embodiment is indicated as a spur gear. If the element is constituted by the diamond point for dressing the grinding disc of a grinding machine, it will be possible by turning the member 136 to effect a displacement of the diamond point relative to the axis of the workpiece up to a predetermined radius, as is disclosed in detail in my co-pending specification Serial No. 521,281, filed July 11, 1955, which specification is referred to for elucidating the operation of the apparatus embodying the invention. The gear 136 is engageable with the auxiliary member 108 by a rack lever 138 pivoted at 140 to the auxiliary member, as is shown in the illustrated embodiment. The rack lever 138 is carried by a spring-loaded piston 142 of a servomotor 144. Compressed air is supplied to the servomotor 144 through a pipe 146 from the supply conduit 106 when during the rotation of the shaft 48 the cam 98 actuates its valve in the controller 50. The pipe 146 is flexible so as to permit movement of the servomotor 144 rigidly connected to the movable auxiliary member 108, as is indicated by the loop 148. Upon application of pressure to the servomotor 144 its piston 142 is moved downwardly and causes the lever 138 to engage the gear 136 with its teeth and to rotate it as the consequence of the axial displacement of the auxiliary member 108. It is readily understood that in a practical design the interconnection between the parts 138 and 136 should be such as to be effective in any relative position of the two parts, i.e. independently of the relative position of elements such as gear teeth, as the parts are brought together.

Disposed on both sides of the projection 130 are servomotors 150, 152, respectively, having reciprocating therein spring-loaded pistons 154 and 155, respectively, carrying piston rods 156. These servomotors communicate with a common supply conduit 158 which is supplied with pressure fluid from the main supply conduit 106 as determined by the cam 96. The pistons 154, 155, under the action of the pressure fluid, will move towards each other to limit positions which are constantly the same, as will be explained hereinafter. These servomotors 150, 152 are materially more powerful than the servomotor 56 acting as a differential manometer.

As indicated hereinbefore, the apparatus may be devised so as to correct the mean error of a plurality of machined workpieces. In the embodiment illustrated, corrections may be effected subsequent to the machining of either each workpiece, or of a plurality of—such as four—workpieces. To this end, the two cams 96, 98 as well as two cams 160, 162 are displaceable along the shaft 48 of the controller 50 so as to cause either the former or the latter cams to be effective for operating the air valves. The cams 160, 162 basically distinguish in design from the cam 96 of FIG. 4 by having only one lobe rather than four lobes 100.

The operation of the apparatus is as follows. Through conduit 14 compressed air is supplied and flows through the conduit 16 and is discharged through the nozzle 20 in the gauging device 10, the air being hereby subjected to a pressure drop sufficient to leave the valve 26 non-actuated. If a workpiece 22 just machined is placed about the cylindrical surface 12 of the gauging device the throttling of the air-flow will be increased which causes the pressure to rise within the conduit 16 and thus also within the conduit 24. This will result in that the valve 26 will be shifted and establishes communication between the lines 32, 28 and the servomotor 36. As a result, the piston 38 of the latter will start moving downward according to FIG. 1, or towards the left as seen in FIG. 3, while rotating the disc 46 of the controller 50. The speed of movement of the piston is adjusted by means of the device 30. One piston stroke may be adjusted to be performed in 10 to 12 seconds, for example. The cams on the shaft 48 will have their lobes so positioned peripherally relative to each other as to cause the cams 92 and 94 to be the first ones to open their valves during the full stroke of the piston 38, during which the disc 46 and shaft 48 are rotated through one quarter of a complete revolution. This will result in that air under pressure from the main supply conduit 106 is supplied to the lines connecting to the two chambers of the servomotor 56 and to the passageway 86 in the gauging device 10. If the internal diameter of the workpiece 22 is true, a pressure will build up in the pipe 84 and thus in the right-hand chamber of the servomotor 56, which pressure is equal to the constant pressure within the pipe 72 and thus in the left-hand chamber of the servomotor, which latter pressure is determined by the pre-adjustable throttling passage 80. Since the pressures are thus equal on both sides of the partition 62, no action will result.

If, however, the workpiece 22 just finished and placed on the gauging device 10 has an internal diameter which is too small, the pressure built up in the lines 74, 84 will be higher than that in line 72. The partition 62 will therefore be subjected to a higher pressure at its right-hand face than at its left-hand face.

At the same time, the cam 94 will have actuated its valve in the controller 50 to place the chamber 120 under pressure and clamp the auxiliary member 108 to the servomotor 118 and thus to the partition 62. As the partition 62 is now displaced to the left according to FIG. 1 by the higher pressure assumed to prevail within the right-hand chamber of the servomotor 56, the auxiliary member 108 will be moved along with said partition. The resulting differential force acting on the partition is small since it is determined solely by the pressure differences which may be created by the various throttling passages, and will oppose to the auxiliary member 108 a correspondingly low resistance. The extent of movement of the member will depend on the magnitude of the pressure difference within the servomotor 56, and thus on the magnitude of the deviation from truth of the inner diameter of the workpiece 22.

In the controller unit 50 the cams 96 and 98 in the position shown are operative. These cams have each four lobes 100 as is shown in FIG. 4 and are thus adapted to open their corresponding valves once per stroke of the piston 38, i.e. once during each rotational movement of the shaft 48 by a quarter of a revolution. When the left-hand displacement of the auxiliary member 108 has ceased, the cam 98 will be operative causing compressed air to be supplied to the servomotor 144 so as to cause the parts 136 and 138 to engage with one another. At the same time the cam 94 acts to close its corresponding valve so as to relieve the chamber 120 of pressure and to disengage the auxiliary member 108 from the partition 62. Since the servomotor 56 has fulfilled its purpose the cam 92 is also allowed to close its corresponding valve causing the servomotor 56 to be relieved of pressure and the partition 62 automatically to return to its initial position together with the servomotor 118. As will be understood from the preceding description this restoring action is a result of the fact that the bellows 58, 60 are resilient.

The auxiliary member 108 has thus been displaced from its starting position by an amount corresponding to the magnitude of the error in the internal diameter of the workpiece 22. In this position the auxiliary member 108 has further been brought into engagement with the member 136 which acts to position the grinder-dressing diamond (not shown). By this time one of the lobes of the cam 96 in the controller 50 will have reached a position such as to admit compressed air into the line 158. This will actuate the two servomotors 150, 152 causing their respective pistons 154 and 155 to move towards one another. In the example assumed, the left-hand piston 154 will engage the projection 130 rigidly attached to the auxiliary member 108 and will move said projection to the right until it reaches its initial position. While the servomotor 56 provides the impulse which imparts to the auxiliary member a response exactly corresponding to the magnitude of the diametrical out-of-truth of the workpiece, the servomotor 150 or 152, respectively, will provide sufficient power for actuating the member 136, and thus the measure-determining element of the machine tool in a corresponding manner.

If a workpiece 22 has an excessive internal diameter, the pressure within the right-hand chamber of the servomotor 56 will be lower than that prevailing within its left-hand chamber, thus causing the auxiliary member to be displaced to the right as viewed in FIG. 1. In this instance, during the return movement, the piston 155 of servomotor 152 will be rendered effective to restore the auxiliary member to its initial position. In other respects the operation will be identical to that already described.

In the alternative case in which the apparatus is to operate in a manner only to correct the position of the measure-determining element in the machine tool for a plurality of machined workpieces, such as four workpieces, for example, the cams 160, 162 of the controller 50 are instead rendered effective. The valve 66 is adjusted to cause the pressure in the servomotor 56 to be only substantially one fourth of the pressure used in the preceding case, which means that the auxiliary member 108 will only move by an amount equal to one fourth for the same diametrical error of the workpiece 22. In the case assumed now the placing of a first workpiece 22 on the gauging device 10 will actuate the servomotors 56 and 118 solely. Thus, if the internal diameter of the workpiece is too great or too small, the auxiliary member 108 will be displaced in one direction or the other to a position at which it will come to rest. The servomotor 118 is active in one direction of movement only of the auxiliary member and will return carrying with it the partition 62 to its initial position.

This first workpiece checked thus resulted in that the piston 38 performed one operating stroke during which the disc 46 together with the shaft 48 was angularly displaced through a quarter of one revolution. For the next two workpieces the same sequence of operative steps is repeated, i.e. the shaft 48 is rotated by a further quarter of a revolution for each workpiece placed on the gauging device 10. Any deviations from the true diametrical measure will cause further displacements of the auxiliary member 108. The latter may thus be subjected to three endwise displacements which may be added to or subtracted from each other depending on whether the machined diameters of the workpieces are greater or smaller than the nominal value. After each gauging operation, the auxiliary member 108 will have stopped at the position to which it has been moved by the servomotor 56. When the fourth workpiece is placed on the gauging device 10, the sequence of operative steps will at first be the same as before, i.e. a displacement of the auxiliary member 108 in one sense or the other in the case of deviation in measure from truth. Only thereafter will the cam 162 be effective causing engagement of the parts 136 and 138, whereupon the auxiliary member 108 is restored by the servomotor 150 or 152 while effecting adjustment of the measure-determining element of the machine tool. Such adjustment will correspond to the mean value of the dimensional errors of four workpieces. In this way the control equipment will be less sensitive to any random measure-deviations.

While one more or less specific embodiment of the invention has been shown or described, it is to be understood that this is for purpose of illustration only, and that the invention is not to be limited thereby, but its scope is to be determined by the appended claims.

What I claim is:

1. Apparatus for correcting the position of a dimension-determining element of a machine tool in response to deviations from a predetermined dimension of a machined surface of a work piece, comprising a gauging device adapted to receive said work piece, a fluid-operated servomotor having a pair movable to and fro, means interconnecting said servomotor and said gauging device and responsive to even a slight deviation of said machined surface of the work piece from a predetermined dimension to actuate said servomotor to move said movable part in one direction or the other a distance and in a direction dependent upon said deviation, an auxiliary member interposed between said movable part and said element and displaceable relative to said element by said movable part upon said movement thereof from a first position to a limit position, other means for connecting said auxiliary member to said element when said auxiliary member has been moved to said limit position, and fluid pressure operated means capable of exerting a relatively heavy force on said auxiliary member and operative to move said auxiliary member from said limit position back to said first position while said element is connected to said auxiliary member thereby to effect movement of said element.

2. Apparatus as defined in claim 1 wherein said auxiliary member is displaceable in opposite directions from said first position, and said fluid pressure operated means comprises two servomotors operative, respectively, upon displacement of said auxiliary member to a limit position in one of said directions and to a limit positon n the other of said directions, respectively, to return said member to said first position.

3. Apparatus as defined in claim 1 wherein said movable part includes coupling means for selectively connecting said movable part to said auxiliary member, said coupling means being operative to interconnect said part and said auxiliary member during displacement of said auxiliary member relative to said element, and operative to disconnect said part and said auxiliary member from one another when said auxiliary member is connected to said element.

4. Apparatus as defined in claim 1 wherein said other means for connecting said auxiliary member to said element comprises a fluid pressure operated coupling device, said device being selectively operable to disconnect said auxiliary member from said element during displacement of said auxiliary member from said first position to said limit position.

5. Apparatus as defined in claim 1 wherein said interconnecting means includes fluid-operated control means operative, each time said gauging device receives a work piece, to cause said movement of said part and displacement of said auxiliary member when the dimension of the machined surface of said work piece deviates from a predetermined dimension, said control means being operative also to operate said other means to connect said auxiliary member to said element only after a plurality of work pieces have been successively received by said guaging device.

6. Apparatus as defined in claim 1 having first fluid pressure operated coupling means selectively operable to interconnect said part to said auxiliary member, second fluid pressure operated coupling means selectively operable to actuate said other means to connect said auxiliary member to said element, and control means operative to control supply of fluid under pressure to the first-named servomotor, said first coupling mean, said second coupling means and said last-named fluid pressure operated means.

7. Apparatus as defined in claim 6 having a fluid pressure operated motor for actuating said control means and operable only in response to a predetermined minimum fluid pressure, means for supplying fluid under a given pressure to the last-named motor, a control nozzle in said gauging device disposed to confront the machined surface of a work piece when received by said gauging device, a conduit for supplying fluid under said given pressure from said supply means to said control nozzle, said machined surface tending to obstruct the orifice in said nozzle thereby to increase the pressure of the fluid fed by said supply means to the last-named motor to at least said predetermined maximum pressure to thereby cause said last-named motor to actuate said control means.

8. Apparatus as defined in claim 7 wherein said gauging device comprises a cylindrical block, and said work piece is an annular work piece and surrounds said cylindrical block, and said machined surface is the inside annular wall of said work piece, and wherein said means interconnecting the first-named servomotor and said gauging device comprises a second nozzle also positioned to confront said machined annular surface, said machined annular surface tending to obstruct the orifice of said second nozzle to an extent depending upon the deviation of the inner diameter of said annular work piece from a predetermined diameter.

References Cited in the file of this patent

UNITED STATES PATENTS

| | | |
|---|---|---|
| 2,065,702 | Hubbard | Dec. 29, 1936 |
| 2,402,293 | Nye | June 18, 1946 |
| 2,771,714 | Schmidt et al. | Nov. 27, 1956 |